J. Monteith,
Geographical Globe.
Nº 29,291.  Patented July 24, 1860.
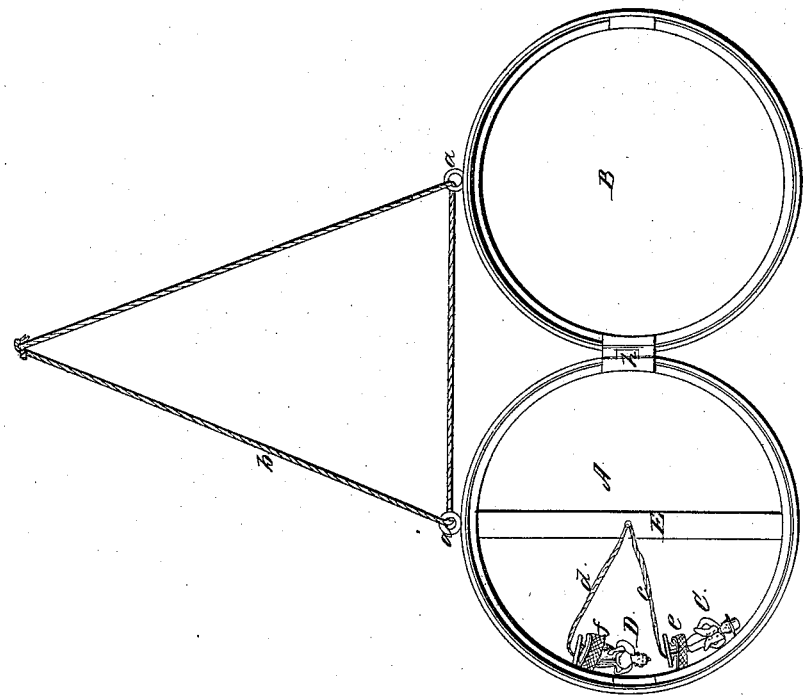
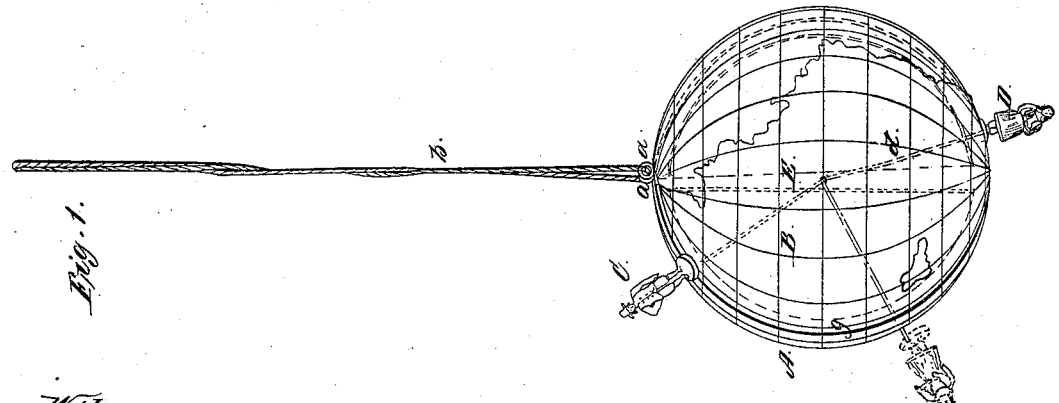
Witnesses:
Inventor:
James Monteith

UNITED STATES PATENT OFFICE.

JAMES MONTEITH, OF NEW YORK, N. Y.

GLOBE.

Specification of Letters Patent No. 29,291, dated July 24, 1860.

*To all whom it may concern:*

Be it known that I, JAMES MONTEITH, of the city, county, and State of New York, have invented a new and useful Improvement in Terrestrial Globes; and I do hereby declare that the following is a full, clear, and exact description of the same, reference being had to the accompanying drawings, forming part of this specification, in which—

Figure 1 is an external view of a terrestrial globe with my improvement. Fig. 2 is an interior view of the same divided into two equal parts.

Similar letters of reference indicate corresponding parts in both figures.

The object of this invention is to aid the teacher in explaining the action of attraction of gravity.

The invention consists in the employment in combination with a terrestrial globe of one or more figures attached to the center of the globe each by an elastic cord or spring of proper length to pass through the shell and hold the figure against the outer surface of the globe.

To enable others to make and use my invention I will proceed to describe it with reference to the drawings.

In the example of my invention represented in the drawing the globe is bisected meridionally and the two hemispheres A, and B, thus produced are hinged together by a hinge $h$, extending a short distance above and below the equator, so that they can be thrown open or closed at pleasure. This construction affords facility for the attachment of the two elastic cords $c$, and $d$, by which the two figures C, and D, are connected with the center, and allows the figures to be placed inside, out of the way when the globe is used for other instruction than in the action of attraction of gravity. Each hemisphere is furnished near the north pole with a staple or ring $a$, to receive a cord $b$, by which the globe may be suspended, the said cord passing through both of said staples or rings and serving by the tension produced upon it by the weight of the suspended globe to keep the hemispheres closed together. The hemisphere A, is provided with a fixed bar E, extended across its center in any direction, and to this bar at or as near as practicable to the center of the globe, there are attached the two india rubber cords $c$, and $d$, which attach the two figures C, and D. These figures should be made with broad bases to enable the cords to hold them against the surface of the globe with their feet toward the center thereof as shown in Fig. 1. Inside of the hemisphere A, there are attached two straps $e$, and $f$, in which the figures are placed, as shown in Fig. 2, when the globe is used for geographical instruction.

To explain the action of attraction of gravity the figures are removed from the straps $e$, and $f$, and drawn out from the hemisphere A, and the two hemispheres are then closed up as shown in Fig. 1, leaving the cords $c$, $d$, passing through the joint $g$, between the hemispheres. While the figures are left free they stand against the surface of the globe as shown in Fig. 1, and may be moved all around the globe over the joint $g$, thus serving to illustrate, what is generally so incomprehensible to the youthful mind, how the people on opposite parts of the earth have their feet toward each other, and how it is that those on the lower part of the globe do not fall off. By pulling the figures away from the surface of the earth as shown in blue color in Fig. 1, and then liberating them to allow them to be drawn back again to the surface the action of falling bodies may be easily explained.

Instead of the globe being made capable of opening in hemispheres it may be made permanently closed with slits in its shell for the passage of the cords $c$, $d$, but as the figures in such case would have to remain outside, they would interfere with geographical instruction, and I therefore prefer to make the globe capable of opening that they may be placed inside as shown in Fig. 2.

Instead of human figures as represented, or in addition to such figures, figures representing other bodies may be employed in a similar manner, but I prefer in all cases to use human figures as by them the principle of gravitation can be more easily explained.

I do not confine myself to any particular construction of the globe, but

What I claim as my invention and desire to secure by Letters Patent is—

The employment in combination with a terrestrial globe of one or more figures attached to the center thereof, by one or more elastic cords or springs of proper length to pass through the shell of the globe and hold the figure or figures against the external surface thereof substantially as and for the purpose herein specified.

JAMES MONTEITH.

Witnesses:
M. M. LIVINGSTON,
W. TUSCH.